United States Patent
Scalisi

(10) Patent No.: US 10,150,425 B1
(45) Date of Patent: Dec. 11, 2018

(54) VEHICLE SPEAKER SYSTEMS AND METHODS

(71) Applicant: Joseph Frank Scalisi, Yorba Linda, CA (US)

(72) Inventor: Joseph Frank Scalisi, Yorba Linda, CA (US)

( * ) Notice: Subject to any disclaimer, the term of this patent is extended or adjusted under 35 U.S.C. 154(b) by 0 days.

(21) Appl. No.: 15/898,528

(22) Filed: Feb. 17, 2018

Related U.S. Application Data

(60) Provisional application No. 62/619,669, filed on Jan. 19, 2018, provisional application No. 62/622,889, filed on Jan. 27, 2018.

(51) Int. Cl.
*H04R 5/02* (2006.01)
*B60R 11/02* (2006.01)
*H04R 1/32* (2006.01)
*B60R 11/00* (2006.01)

(52) U.S. Cl.
CPC .......... *B60R 11/0217* (2013.01); *H04R 1/323* (2013.01); *H04R 5/02* (2013.01); *B60R 2011/0028* (2013.01); *H04R 2499/13* (2013.01)

(58) Field of Classification Search
CPC ........ B60R 11/0217; B60R 2011/0028; H04R 1/323; H04R 5/02; H04R 2499/13
See application file for complete search history.

(56) References Cited

U.S. PATENT DOCUMENTS

| | | | |
|---|---|---|---|
| 4,827,520 A | 5/1989 | Zeinstra | |
| 5,680,468 A | 10/1997 | Van Hout | |
| 6,055,478 A | 4/2000 | Heron | |
| 6,427,017 B1 | 7/2002 | Toki | |
| 6,914,991 B1 * | 7/2005 | Pompei | H04R 3/00 381/111 |
| 7,440,578 B2 * | 10/2008 | Arai | A47C 7/72 381/302 |
| 7,596,228 B2 | 9/2009 | Pompei | |
| 8,027,488 B2 | 9/2011 | Pompei | |
| 8,290,173 B2 * | 10/2012 | Richenstein | H04H 20/62 381/77 |
| 9,036,827 B2 | 5/2015 | Pompei | |
| 9,820,055 B2 | 11/2017 | Babayoff | |
| 2008/0273711 A1 * | 11/2008 | Broussard | H04B 1/3822 381/86 |
| 2011/0033074 A1 | 2/2011 | Chang | |
| 2011/0261021 A1 | 10/2011 | Modarres | |
| 2017/0276764 A1 | 9/2017 | Vilermo | |

* cited by examiner

*Primary Examiner* — Brian Ensey

(57) ABSTRACT

Vehicle speaker systems described herein enable different people to simultaneously hear different sounds while traveling in the same vehicle (without using headphones). This revolutionary result is based on novel speaker configurations and uses. Some vehicle audio systems include a first speaker system located above a first seat of a vehicle and configured to emit a first sound based on a first audio file. Vehicle audio systems can also include a second speaker system coupled to the vehicle and configured to emit a second sound based on a second audio file that is unrelated to the first audio file while the first speaker system emits the first sound.

28 Claims, 10 Drawing Sheets

VEHICLE SPEAKER SYSTEMS AND METHODS

CROSS-REFERENCE TO RELATED APPLICATIONS

The entire contents of the following application are incorporated by reference herein: U.S. Patent Application No. 62/619,669; filed Jan. 19, 2018; and entitled VEHICLE SPEAKER SYSTEMS AND METHODS.

The entire contents of the following application are incorporated by reference herein: U.S. Patent Application No. 62/622,889; filed Jan. 27, 2018; and entitled VEHICLE SPEAKER SYSTEMS AND METHODS.

BACKGROUND

Field

Various embodiments disclosed herein relate to vehicles. Certain embodiments relate to vehicle speaker systems.

Description of Related Art

Vehicles often include speaker systems configured to play music, podcasts, audiobooks, etc. A vehicle's audio system can include many speakers placed around occupants of the vehicle. There are times, however, when not all occupants of the vehicle want to hear the same music from the vehicle's speaker system. In some cases, this problem is solved by occupants using headphones, but headphones are not ideal in certain situations. For example, in many locations, laws prohibit drivers from wearing headphones. If the driver uses the vehicle's speakers to listen to music, a passenger wearing noise-canceling headphones can often still hear the music coming from the vehicle's speakers. In addition, headphones can be uncomfortable when worn for long periods of time on road trips. As a result, there is a need for systems and methods that enable different people in a vehicle to hear different music from the vehicle's speaker system without using headphones.

SUMMARY

Vehicle speaker systems described herein enable different people to simultaneously hear different sounds while traveling in the same vehicle (without using headphones). This revolutionary result is based on novel speaker configurations and uses.

In some embodiments, a vehicle audio system is coupled to a vehicle. The vehicle audio system can include a first speaker system that is located above a first seat of the vehicle and is configured to emit a first sound based on a first audio file. The vehicle audio system can also include a second speaker system that is coupled to the vehicle and is configured to emit a second sound based on a second audio file that is unrelated to the first audio file while the first speaker system emits the first sound.

In several embodiments, the first speaker system can be oriented downward (e.g., such that downward is the main sound propagation direction) from a ceiling of the vehicle towards a driver seat of the vehicle such that the vehicle audio system is configured to make the first sound at least 20 percent, at least 40 percent, and/or at least 100 percent louder for a driver of the vehicle than for a passenger sitting in a passenger seat of the vehicle.

In some embodiments, the second speaker system is located above a second seat of the vehicle and is oriented downward from a ceiling of the vehicle towards the second seat such that the vehicle audio system is configured to make the second sound at least 20 percent, at least 40 percent, and/or at least 100 percent louder at a second sitting position of the second seat compared to a first sitting position of the first seat. The first speaker system can be oriented downward from the ceiling of the vehicle towards the first seat such that the vehicle audio system is configured to make the first sound at least 20 percent, at least 40 percent, and/or at least 100 percent louder at the first sitting position of the first seat compared to the second sitting position of the second seat.

In several embodiments, the first speaker system is communicatively coupled to a first media player (e.g., a car's stereo system) such that the first speaker system emits the first sound based on the first audio file from the first media player. The second speaker system can be communicatively coupled to a second media player (e.g., a smartphone) such that the second speaker system emits the second sound based on the second audio file from the second media player.

In some embodiments, the first speaker system is coupled to a ceiling of the vehicle and is oriented such that the first sound is primarily directed in a first direction from the ceiling towards the first seat. The second speaker system can be located above a second seat of the vehicle. The second speaker system can be coupled to the ceiling of the vehicle and can be oriented such that the second sound is primarily directed in a second direction from the ceiling towards the second seat.

In several embodiments, the vehicle communicatively couples the second media player to at least a portion of the vehicle that is configured to receive the second audio file from the second media player and then transmit a signal to the second speaker system. This signal can be configured to enable the second speaker system to emit the second sound based on the second audio file.

In some embodiments, the first media player is a portion of the vehicle. The portion can be a multimedia entertainment system of the vehicle. In several embodiments, the first media player is a stereo system of the vehicle. The stereo system can include controls on the center console and steering wheel of the vehicle. The second media player can be a portable media player (e.g., a smartphone, an iPod made by Apple Inc., a portable DVD player, a portable gaming console such as the Nintendo Switch) configured to be transportable by a passenger of the vehicle once the passenger reaches a drop-off location and exits the vehicle. For example, the system can enable a passenger to choose a song on her iPhone (made by Apple Inc.) and then listen to the song from the second speaker system while a driver of the vehicle listens to a podcast or book on tape from the first speaker system. The orientation and high directivity of the second speaker system enables the volume (measured in decibels) of the song to be at least 40 percent higher for the passenger (in a second seat) than for the driver (in the first seat). The orientation and high directivity of the first speaker system enables the volume (measured in decibels) of the podcast or book on tape to be at least 40 percent higher for the driver (in the first seat) than for the passenger (in the second seat).

In several embodiments, the first speaker system comprises a first speaker having a first diaphragm that is oriented towards the first seat. The first diaphragm can have a first outer diameter of at least ten inches and/or at least twenty inches. The second speaker system can comprise a second speaker having a second diaphragm that is oriented towards a second seat of the vehicle. The second diaphragm can have a second outer diameter of at least ten inches and/or at least twenty inches. In some embodiments, sound domes are used to simulate the effect of using a large diaphragm. The first and second speaker systems can be at least partially recessed in a ceiling of the vehicle and coupled to the ceiling.

In some embodiments, the first speaker system comprises a first speaker array having at least five speakers and/or at least nine speakers oriented towards the first seat. The second speaker system can comprise a second speaker array having at least five speakers and/or at least nine speakers oriented towards a second seat of the vehicle. The first and second speaker arrays can be at least partially recessed in a ceiling of the vehicle and coupled to the ceiling of the vehicle. An array of speakers can simulate the effect of using a large diaphragm. In other words, an array of small speakers can have the same directivity as one speaker than is substantially larger than any one of the small speakers.

In several embodiments, the first speaker system comprises a first speaker and a first sound dome. The first speaker can be configured to emit the first sound towards a first interior area of the first dome. The first dome can be configured to direct the first sound towards the first seat.

In some embodiments, the second speaker system comprises a second speaker and a second sound dome. The second speaker can be configured to emit the second sound towards a second interior area of the second dome. The second dome can be configured to direct the second sound towards a second seat of the vehicle. The sound domes can have outer diameters (measured at the largest diameter of the dome) of at least five inches, at least ten inches, and/or at least twenty inches. The first and second domes can be at least partially recessed in a ceiling of the vehicle and can be coupled to the ceiling.

In several embodiments, the first speaker system comprises a first parametric audio amplifier system configured to use modulated ultrasound to create the first sound in air of a first sitting position of the first seat. The first parametric audio amplifier system can be coupled to a ceiling of the vehicle such that the first parametric audio amplifier system is configured to direct the modulated ultrasound towards the first sitting position. The second speaker system can comprise a second parametric audio amplifier system configured to create the second sound.

In some embodiments, the first speaker system comprises a battery configured to provide electrical power to the first speaker system. The first speaker system can comprise a near-field charging module configured to enable the vehicle to wirelessly charge the battery.

In several embodiments, the first speaker system can comprise an antenna configured to receive a first wireless communication adapted to enable the first speaker system to emit the first sound. Wireless communication can be via any suitable means including radio-wave communication, Bluetooth communication, Bluetooth-Low-Energy ("BLE") communication, infrared communication, and wireless local area network ("WiFi") communication.

In some embodiments, the first speaker system is communicatively coupled to a first media player of the vehicle by a first cable, and the second speaker system is communicatively coupled to the first media player by a second cable.

In several embodiments, a portable media player is wirelessly communicatively coupled to the first media player such the first media player is configured to receive the second audio file from the portable media player and then send a signal via the second cable to the second speaker system to enable the vehicle audio system to simultaneously play a first audio from the first media player via the first speaker system and play a second audio from the portable media player via the second speaker system such that the first audio is primarily directed to the first seat and the second audio is primarily directed to a second seat of the vehicle to enable a first passenger sitting in the first seat to primarily hear the first audio and to enable a second passenger sitting in the second seat to primarily hear the second audio. In some embodiments, the first audio can be a first song and the second audio can be a second song, which is not the first song. For example, rather than a system that plays different parts of one song from different speakers in a car, the vehicle audio system enables the important advantage of being able to play two different songs at the same time inside the vehicle. The driver can listen to one song while a passenger can listen to a different song at the same time. The orientation and directivity of the speakers enable the driver to hear her song much louder than the passenger can hear the driver's song. Similarly, the orientation and directivity of the speakers enable the passenger to hear his song much louder than the driver can hear the passenger's song. In some embodiments, the driver cannot hear the passenger's song and the passenger cannot hear the driver's song even though the driver's song and the passenger's song are being played by the vehicle at the same time.

In some embodiments, the first speaker system is configured to receive a wireless communication via a light data transmission from the vehicle, and the wireless communication is adapted to enable the first speaker system to emit the first sound.

In several embodiments, the vehicle comprises a first directional antenna located in a front half of the vehicle and a second directional antenna located in the back half of the vehicle. The first directional antenna and the second directional antenna can be communicatively coupled to a signal processor configured to measure signal strength from a portable media player located in the vehicle to determine if the portable media player is located closer to the first seat or closer to a second seat of the vehicle. The second speaker system can be located above the second seat. The vehicle audio system can be configured to emit the second sound from the second speaker system (and not from the first speaker system) in response to determining that the portable media player is closer to the second seat than to the first seat. The vehicle audio system can be configured to emit another sound from the first speaker system (and not from the second speaker system) in response to determining that the portable media player is closer to the first seat than to the second seat. The directional antenna system can be used to play music received from a particular media player at a particular speaker location in response to determining that the media player is most likely being held at a seat under the particular speaker location.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
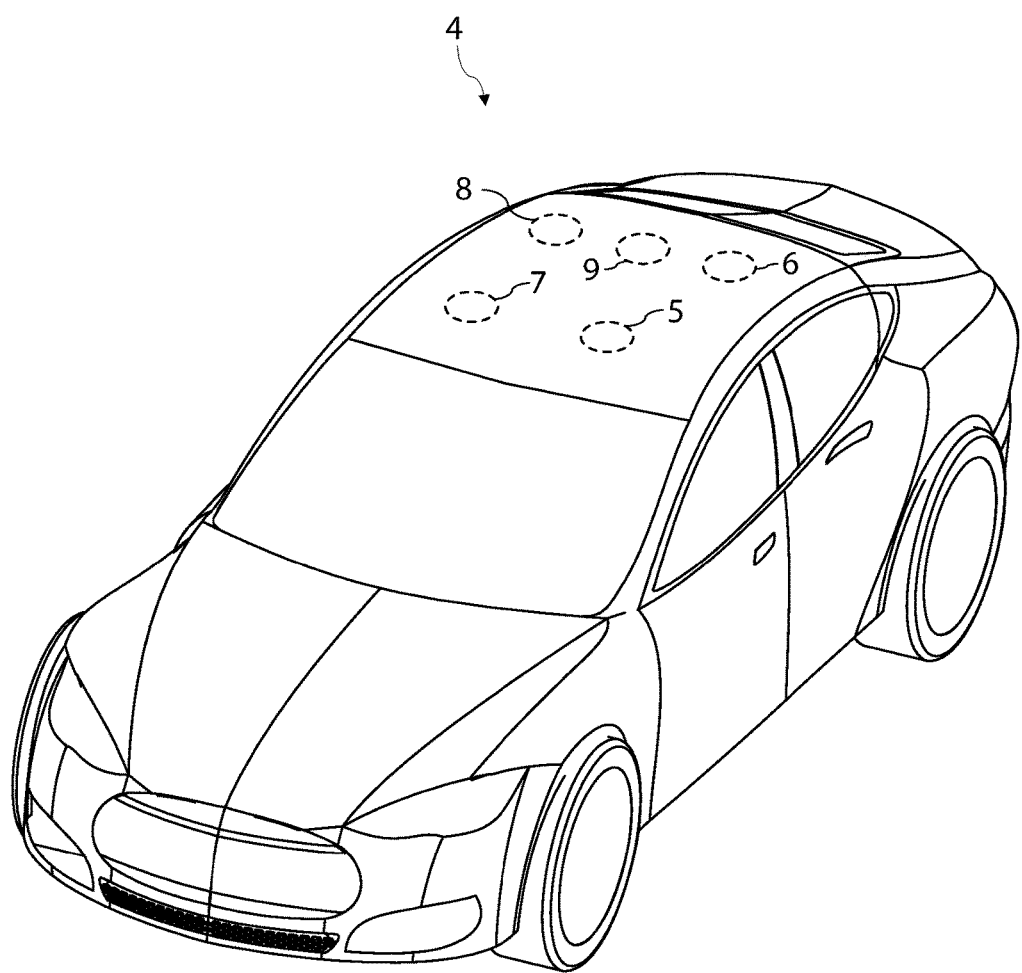
FIG. 1 illustrates a perspective view of a vehicle, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Vehicles often include speaker systems configured to play music, podcasts, movie audio, phone-call audio, audiobooks, etc. Systems can include many speakers placed around occupants of the vehicle. There are times, however, when not all occupants of the vehicle want to hear the same music from the vehicle's speaker system. In some cases, this problem is solved by occupants using headphones, but headphones are not ideal in certain situations. For example, in many locations, laws prohibit drivers from wearing headphones. If the driver uses the vehicle's speakers to listen to music, a passenger wearing noise-canceling headphones can often still hear the music coming from the vehicle's speakers. In addition, headphones can be uncomfortable when worn for long periods of time on road trips. Systems and methods described herein enable different people in a vehicle to hear different music from the vehicle's speaker system without using headphones.

Some embodiments use speaker location, speaker orientation, speaker construction, and/or speaker directivity to enable different passengers in a vehicle to hear their own audio content while dramatically reducing (or even eliminating) the volume of audio content intended for other passengers. For example, a first passenger might choose to listen to a podcast. A second passenger might choose to listen to a song. Systems and methods described herein can enable the first passenger to hear the podcast while minimizing the sound volume (as measured in decibels) of the song at the first passenger's seat, while also enabling the second passenger to hear the song while minimizing the sound volume (as measured in decibels) of the podcast at the second passenger's seat.

Loudspeakers (often just called "speakers") are electroacoustic transducers that are configured to convert electrical audio signals (e.g., from a car's stereo system) into a corresponding sound. To create sound from an electric signal, an alternating current electrical audio signal can be applied to a coil of wire suspended in a gap between poles of a magnet. This configuration forces the coil to move back and forth, which causes a diaphragm attached to the coil to also move back and forth. The movement of the diaphragm pushes air, which creates sound waves. These types of speakers have been used for a long time, but include a major drawback: The sound waves spread out almost like ripples from throwing a rock in a still pond. This spreading of the sound can be desirable when the system is intended to spread sound to a large group, but in other scenarios causes substantial noise pollution as sound travels to unwanted areas.

Directional sound systems create fields of sound that spread less than traditional loudspeakers. In the context of a vehicle, a directional speaker can be placed above the head of each person inside the car. Ideally, each directional speaker would only be heard by the person directly below the directional speaker.

Many different types of directional speakers can be used for the embodiments described here. Increasing the effective size of the source of the sound and/or decreasing the wavelength of the sound helps to improve the directivity of the sound. As used herein, directivity represents the degree to which a sound is concentrated in a single direction.

Some speaker embodiments have a very large source of sound. For example, the speaker located over the person can have a diameter of 10 to 24 inches. The large source of sound helps provide better directivity than smaller sound sources typically provide. Large sound sources, however, can be very expensive and can also be too large for convenient integration into vehicles.

A large sound source can be simulated by using an array of smaller speakers. An array of smaller speakers can have approximately the same effective directivity as one much larger speaker. In some embodiments, the array of speakers comprises a 3 by 3 speaker array, a 5 by 5 speaker array, a 10 by 10 speaker array, or a 15 by 20 speaker array. In some embodiments, the array of speakers comprises at least 3 speakers by at least 3 speakers, at least 5 speakers by at least 5 speakers, at least 10 speakers by at least 10 speakers, less than 5 speakers by 5 speakers, less than 10 speakers by 10 speakers, and/or less than 25 speakers by 30 speakers. The individual speakers in the array can be evenly spaced or can be unevenly spaced.

Sound domes can also be used to improve the directivity of one or more speakers. The size of the sound dome (which can be much larger in diameter than the speaker inside the sound dome), can essentially give the speaker inside the sound dome the directivity of the size of the sound dome. In other words, a sound dome can make a small speaker have approximately the directivity of a much larger speaker while being much less expensive than the larger speaker.

Some speaker embodiments have high directivity due to modulating audible sound onto high-frequency ultrasound. The high-frequency ultrasound has short wavelengths. As a result, the sound from these embodiments has excellent directivity.

FIG. 1 illustrates a perspective view of a vehicle 4 (e.g., a car, bus, or aircraft configured to carry passengers). The vehicle 4 can be any type of mobile vehicle. The vehicle 4 includes speakers 5, 6, 7, 8, 9 coupled to a ceiling 19 of the vehicle 4. (The ceiling 19 is labeled in FIG. 4.) The speakers 5, 6, 7, 8, 9 are shown as dashed lines because the speakers 5, 6, 7, 8, 9 are located inside a cab of the vehicle 4 and are oriented downwards from the ceiling 19 towards seats 11, 12, 13, 14, 15 of the vehicle 4. The seats 11, 12, 13, 14, 15 can include bottom supports, back supports, and headrests. Each seat 11, 12, 13, 14, 15 has its own speaker system. In some embodiments, each speaker system includes only one speaker. In several embodiments, however, each speaker system includes several speakers (e.g., to enable stereo sound at each seat).

Figure 2:
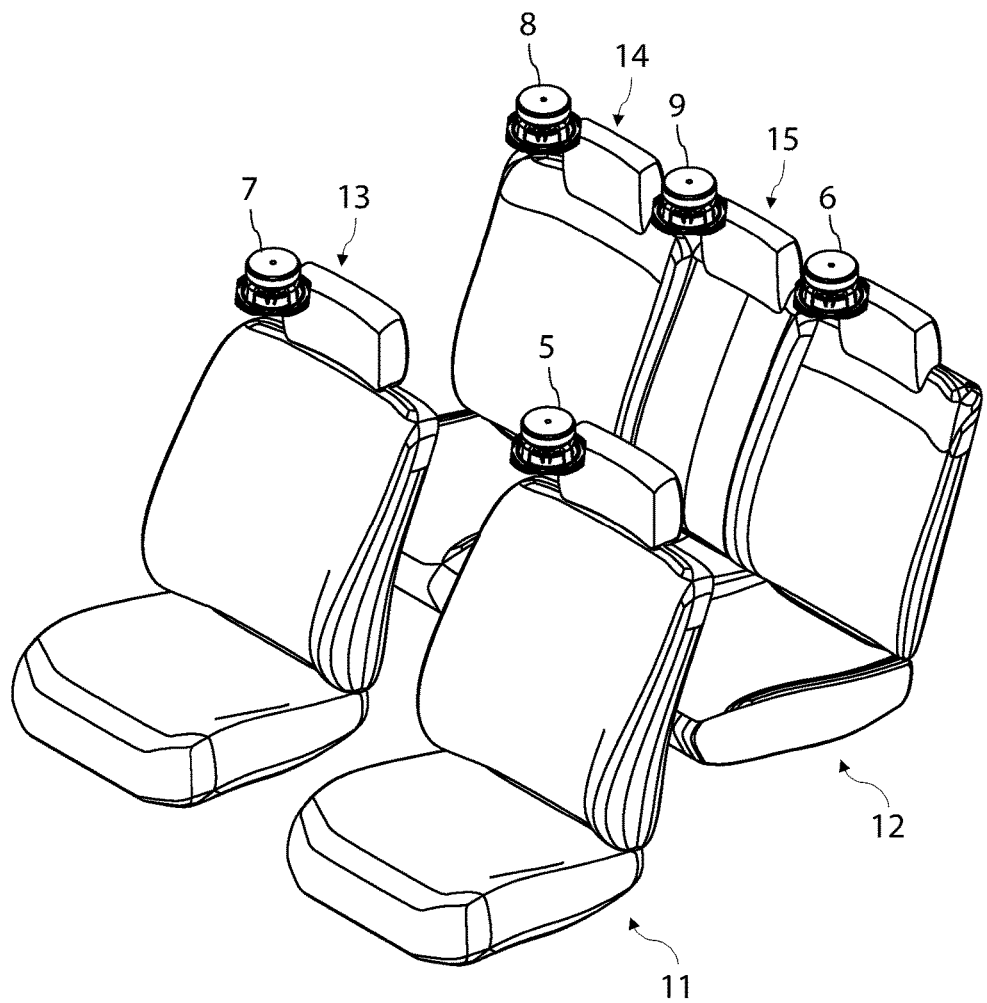
FIG. 2 illustrates a perspective view of the vehicle illustrated in FIG. 1 with many portions of the vehicle hidden to provide a clear view of speakers and seats of the vehicle, according to some embodiments.

FIG. 2 illustrates a perspective view of the vehicle 4 with many portions of the vehicle 4 hidden to provide a clear view of speakers 5, 6, 7, 8, 9 and seats 11, 12, 13, 14, 15 of the vehicle 4. The vehicle 4 can also include other speakers that are not shown in FIG. 2. For example, the vehicle 4 can include speakers in the dash, doors, side pillars, seats, and trunk. Each seat 11, 12, 13, 14, 15 has a speaker system located directly above the seat 11, 12, 13, 14, 15. Each speaker system can simultaneously emit a different song. For example, in the embodiment illustrated in FIG. 2, the system could simultaneously "play" five unrelated songs.

Figure 3:
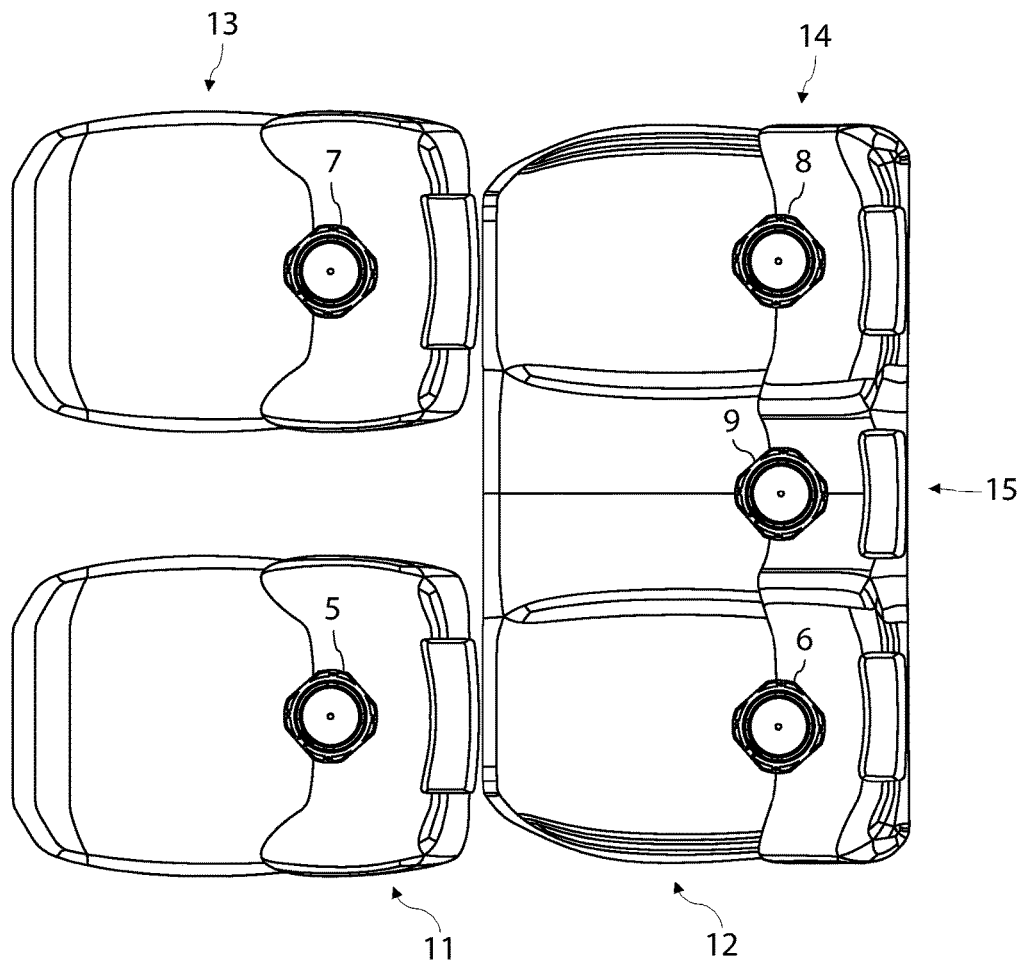
FIG. 3 illustrates a top view of the vehicle illustrated in FIG. 1 with many portions of the vehicle hidden to provide a clear view of speakers and seats of the vehicle, according to some embodiments.

FIG. 3 illustrates a top view of the vehicle 4 with many portions of the vehicle 4 hidden to provide a clear view of speakers 5, 6, 7, 8, 9 and seats 11, 12, 13, 14, 15 of the vehicle 4. The speakers 5, 6, 7, 8, 9 are oriented towards the seats 11, 12, 13, 14, 15 and are located above the seats 11, 12, 13, 14, 15.

To reduce unnecessary redundancy, some embodiments are described in the context of one type of speaker, but all embodiments can use any of the speakers described herein and/or incorporated by reference. All embodiments can also use any combination of the speakers described herein and/or incorporated by reference.

Figure 4:
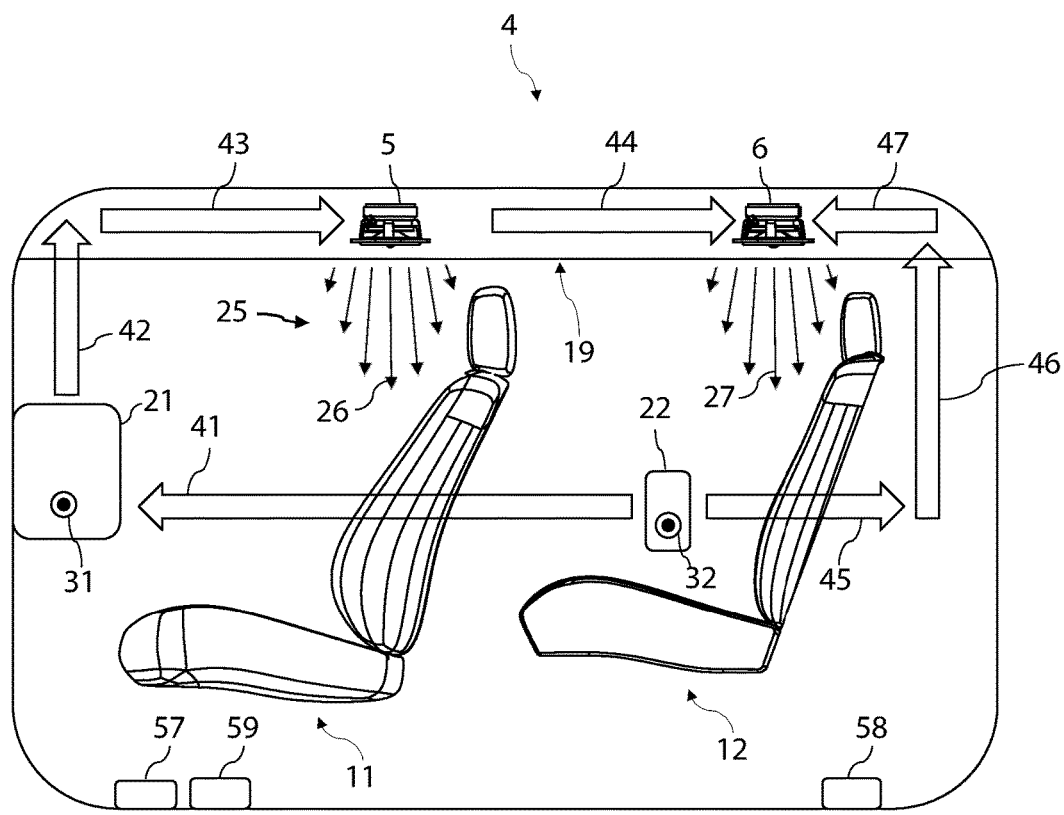
FIG. 4 illustrates a diagrammatic, side view of the vehicle illustrated in FIG. 1, according to some embodiments.

FIG. 4 illustrates a diagrammatic, side view of the vehicle 4 with many portions of the vehicle 4 hidden to provide a clear view of speakers 5, 6, 7, 8, 9 and seats 11, 12, 13, 14, 15 of the vehicle 4. A vehicle audio system is coupled to a vehicle 4.

The vehicle audio system can include a first speaker system 5 that is located above a first seat 11 of the vehicle 4 and is configured to emit a first sound based on a first audio file 31 (e.g., an "MP3" file or any other suitable audio file). As used herein, "above" is defined in a direction away from the force of gravity when the vehicle's wheels are on level ground.

The vehicle audio system can also include a second speaker system 6 that is coupled to the vehicle 4 and is configured to emit a second sound based on a second audio file 32 that is unrelated to the first audio file 31 while the first speaker system 5 emits the first sound.

In several embodiments, the first speaker system 5 can be oriented downward from a ceiling 19 of the vehicle 4 towards a driver seat 11 of the vehicle 4 such that the vehicle audio system is configured to make the first sound at least 20 percent, at least 40 percent, and/or at least 100 percent louder for a driver of the vehicle 4 than for a passenger sitting in a passenger seat 12 of the vehicle 4.

In some embodiments, the second speaker system 6 is located above a second seat 12 of the vehicle 4 and is oriented downward from a ceiling 19 of the vehicle 4 towards the second seat 12 such that the vehicle audio system is configured to make the second sound at least 20 percent, at least 40 percent, and/or at least 100 percent louder at a second sitting position of the second seat 12 compared to a first sitting position of the first seat 11. The first speaker system 5 can be oriented downward from the ceiling 19 of the vehicle 4 towards the first seat 11 such that the vehicle audio system is configured to make the first sound at least 20 percent, at least 40 percent, and/or at least 100 percent louder at the first sitting position of the first seat 11 compared to the second sitting position of the second seat 12. As used herein, "sitting position" is an area in which an average person sits when seated in a seat.

In several embodiments, the first speaker system 5 is communicatively coupled to a first media player 21 (e.g., a car's stereo system) such that the first speaker system 5 emits the first sound based on the first audio file 31 from the first media player 21. The second speaker system 6 can be communicatively coupled to a second media player 22 (e.g., a smartphone) such that the second speaker system 6 emits the second sound based on the second audio file 32 from the second media player 22.

As illustrated in FIG. 4, the first speaker system 5 is coupled to a ceiling 19 of the vehicle 4 and is oriented such that the first sound is primarily directed in a first direction 26 from the ceiling 19 towards the first seat 11. The second speaker system 6 is be located above a second seat 12 of the vehicle 4. The second speaker system 6 is coupled to the ceiling 19 of the vehicle 4 and is oriented such that the second sound is primarily directed in a second direction 27 from the ceiling 19 towards the second seat 12.

FIG. 4 includes arrows 25 to show how a speaker 5 is primarily directed in a first direction 26 from the ceiling 19 towards the first seat 11. The length of the arrows 25 represents the directivity of sound being emitted by the speaker 5. The angles of the arrows 25 (combined with the length of the arrows 25) represent how the sound from the speaker 5 has a higher volume in a direction 26 directly out of the speaker 5 and has lower volume at greater angles (as measured from the direction 26 directly out of the speaker 5). This "long throw" speaker 5 helps to make the volume higher as perceived by the driver sitting in a first seat 11 than for the passenger sitting in another seat 12. Thus, the speaker 5 is primarily directed to the first seat 11 and is not primarily directed to the other seats 12, 13, 14, 15 shown in FIGS. 3 and 4. Thus, as a result of the first speaker 5 being primarily directed at the first seat 11, the volume from the second speaker 5 is at least 40 percent higher as measured at the first seat 11 than as measured at other seats 12, 13, 14, 15.

In contrast, the second speaker 6 is primarily directed in a second direction 27 from the ceiling 19 to the second seat 12. As a result of the second speaker 6 being primarily directed at the second seat 12, the volume from the second speaker 6 is higher as perceived by a passenger in the second seat 12 than for the people sitting in other seats 11, 13, 14, 15. Thus, as a result of the second speaker 6 being primarily directed at the second seat 12, the volume from the second speaker 6 is at least 40 percent higher as measured at the second seat 12 than as measured at other seats 11, 13, 14, 15.

In several embodiments, the vehicle 4 communicatively couples the second media player 22 (e.g., a smartphone) to at least a portion 21 (e.g., a stereo system) of the vehicle 4 that is configured to receive the second audio file 32 from the second media player 22 and then transmit a signal to the second speaker system 6. This signal can be configured to enable the second speaker system 6 to emit the second sound based on the second audio file 32. Arrow 41 in FIG. 4 illustrates communication between the music control system 21 of the vehicle 4 and the second media player 22. Arrows 42, 44 illustrate the music control system 21 sending the signal to the second speaker system 6.

Arrows 45, 46, 47 illustrate that the second media player 22 can also send audio data directly and wirelessly to the second speaker system 6. The music control system 21 can also send audio data to the first speaker system 5 (as shown by arrows 42, 43).

In some embodiments, the first media player 21 is a portion of the vehicle 4. In several embodiments, the first media player 21 is a stereo system of the vehicle 4. The stereo system can include controls on the center console and steering wheel of the vehicle 4. The second media player 22 can be a portable media player (e.g., a smartphone, an iPod made by Apple Inc., a portable DVD player, a portable gaming console such as the Nintendo Switch) configured to be transportable by a passenger of the vehicle 4 once the passenger reaches a drop-off location and leaves the vehicle 4. For example, the system can enable a passenger to choose a song on her iPhone (made by Apple Inc.) and then listen to the song from the second speaker system 6 while a driver of the vehicle 4 listens to a podcast or book on tape from the first speaker system 5. The orientation and high directivity of the second speaker system 6 enables the volume (measured in decibels) of the song to be at least 40 percent higher for the passenger (in a second seat 12) than for the driver (in the first seat 11). The orientation and high directivity of the first speaker system 5 enables the volume (measured in decibels) of the podcast or book on tape to be at least 40 percent higher for the driver (in the first seat 11) than for the passenger (in the second seat 12).

Figure 6:
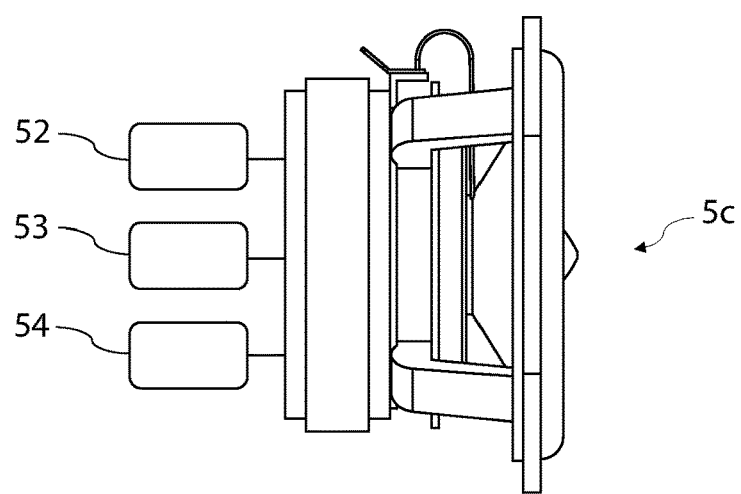
FIG. 6 illustrates a side view of a speaker, according to some embodiments.
Figure 7:
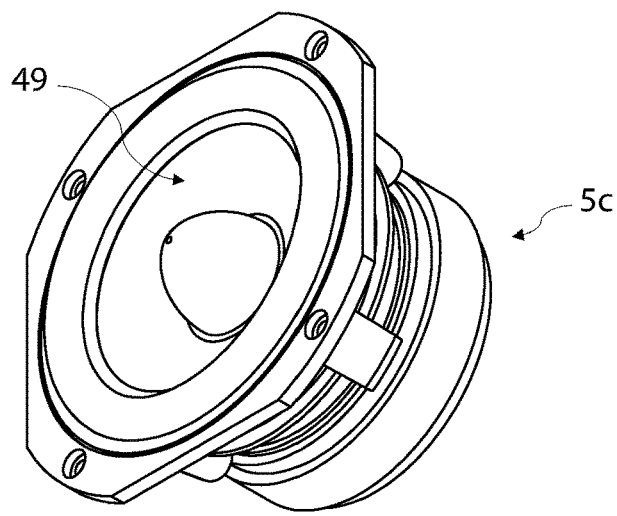
FIG. 7 illustrates a perspective view of the speaker illustrated in FIG. 6, according to some embodiments.

Many different types of speakers can be used with the embodiments described herein. FIG. 6 illustrates a side view of a first speaker 5c that has a first diaphragm 49. The first speaker system 5 can include several speakers like the speaker 5c illustrated in FIG. 6. FIG. 7 illustrates a perspective view of the speaker 5c.

Referring now primarily to FIGS. 4, 6 and 7, in several embodiments, the first speaker system 5 comprises a first speaker 5c having a first diaphragm 49 that is oriented towards the first seat 11. The first diaphragm 49 can have a first outer diameter of at least ten inches and/or at least twenty inches. The second speaker system 6 can comprise a second speaker having a second diaphragm that is oriented towards a second seat 12 of the vehicle 4. The second diaphragm can have a second outer diameter of at least ten inches and/or at least twenty inches. In some embodiments, sound domes are used to simulate the effect of using a large diaphragm. The first and second speaker systems 5, 6 can be at least partially recessed in a ceiling 19 of the vehicle 4 and/or coupled to the ceiling 19.

Figure 5:
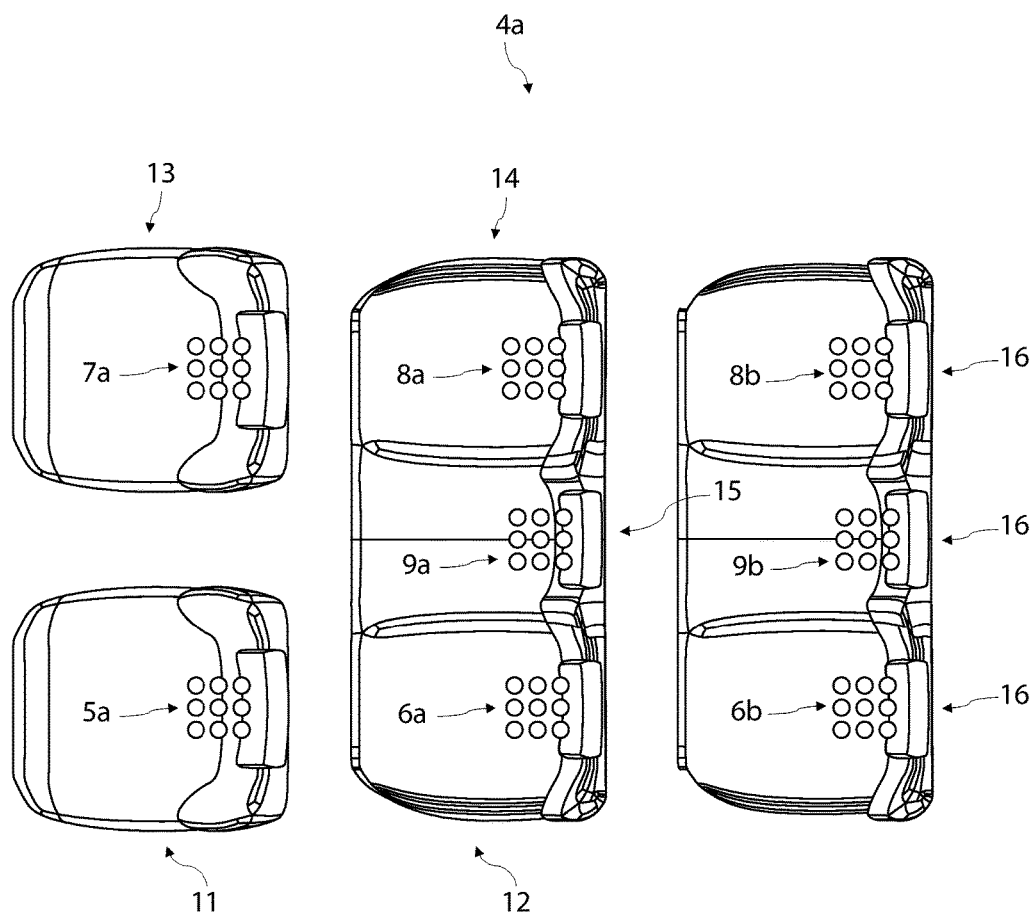
FIG. 5 illustrates a top view of a vehicle that comprises many seats, according to some embodiments.

FIG. 5 illustrates a top view of a vehicle 4a that comprises many seats 11, 12, 13, 14, 15, 16. The vehicle 4a can include any of the features described in the context of vehicle 4. FIG. 5 illustrates nine speakers above each seat 11, 12, 13, 14, 15, 16. Each set of nine speakers 5a, 6a, 7a, 8a, 9a, 6b, 8b, 9b forms an embodiment of an array of speakers. The speakers can be any type of speaker described herein and/or incorporated by reference. A speaker array 5a is located above a first seat 11 such that all nine speakers of the speaker array 5a are directed towards the first seat 11.

In some embodiments, the first speaker system 5 comprises a first speaker array 5a having at least five speakers and/or at least nine speakers oriented towards the first seat 11. The second speaker system 6 can comprise a second speaker array 6a having at least five speakers and/or at least nine speakers oriented towards a second seat 12 of the vehicle 4. The first and second speaker arrays 5a, 6a can be at least partially recessed in a ceiling 19 of the vehicle 4. An array of speakers can simulate the effect of using a large diaphragm. In other words, an array of small speakers can have the same directivity as one speaker than is substantially larger than any one of the small speakers.

Figure 9:
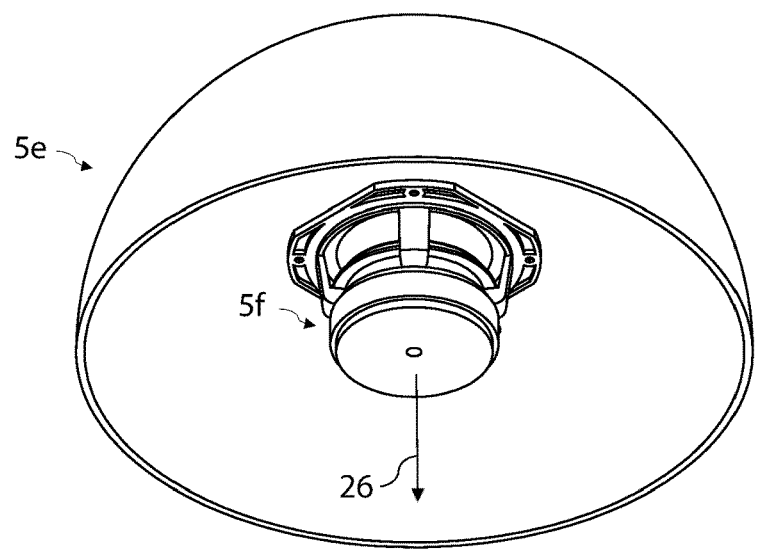
FIG. 9 illustrates a perspective view of a speaker that comprises a sound dome, according to some embodiments.

FIG. 9 illustrates a perspective view of a speaker system that comprises a first speaker 5f and a first sound dome 5e. The speaker system 5 described in other embodiments herein can comprise the first speaker 5f and the first sound dome 5e. The first speaker 5f is configured to emit the first sound towards a first interior area of the first dome 5e. The first dome 5e is configured to direct the first sound towards the first seat 11 (e.g., as indicated by arrow 26 in FIGS. 4 and 9).

In some embodiments, the second speaker system 6 comprises a second speaker and a second sound dome. The second speaker can be configured to emit the second sound towards a second interior area of the second dome. The second dome can be configured to direct the second sound towards a second seat 12 of the vehicle 4. The sound domes can have outer diameters (measured at the largest diameter of the dome) of at least five inches, at least ten inches, and/or at least twenty inches. The first and second domes can be at least partially recessed in a ceiling 19 of the vehicle 4.

Figure 8:
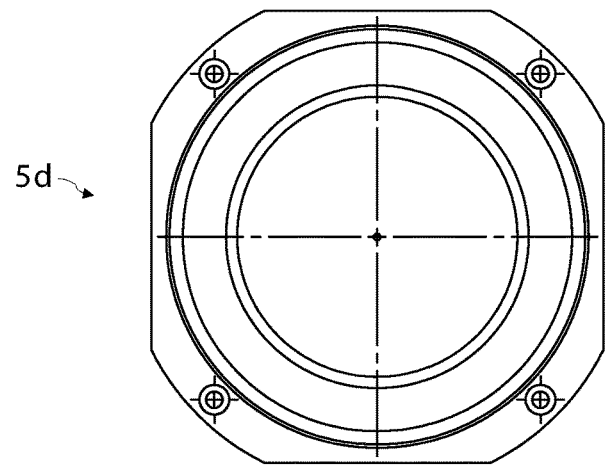
FIG. 8 illustrates a front view of a parametric audio amplifier system, according to some embodiments.

FIG. 8 illustrates a front view of a parametric audio amplifier system 5d, which can be a portion of any of the speaker systems described herein.

Referring now primarily to FIGS. 4 and 8, in several embodiments, the first speaker system 5 comprises a first parametric audio amplifier system 5d configured to use modulated ultrasound to create the first sound in air of a first sitting position of the first seat 11. The first parametric audio amplifier system 5d can be coupled to a ceiling 19 of the vehicle 4 such that the first parametric audio amplifier system 5d is configured to direct the modulated ultrasound towards the first sitting position. The second speaker system 6 can comprise a second parametric audio amplifier system configured to create the second sound.

As described in U.S. Pat. No. 6,914,991, which is incorporated by reference herein, a parametric audio amplifier system can include an amplifier assembly for amplifying an ultrasonic carrier signal modulated with a processed audio signal, an acoustic transducer assembly for projecting a sonic beam corresponding to the amplified ultrasonic signal through air to regenerate the audio signal, and a low voltage connection for carrying the amplified ultrasonic signal from the amplifier assembly to the acoustic transducer assembly.

Referring now primarily to FIGS. 6 and 7, in some embodiments, the first speaker system 5 comprises a battery 52 configured to provide electrical power to the first speaker system 5. The first speaker system 5 can comprise a near-field charging module 53 configured to enable the battery 52 to be wirelessly charged by the vehicle 4.

In several embodiments, the first speaker system 5 can comprise an antenna 54 configured to receive a first wireless communication adapted to enable the first speaker system 5 to emit the first sound. Wireless communication can be via any suitable means including radio-wave communication, Bluetooth communication, Bluetooth-Low-Energy ("BLE") communication, infrared communication, and wireless local area network ("WiFi") communication.

Referring now primarily to FIG. 4, in some embodiments, the first speaker system 5 is communicatively coupled to a first media player 21 of the vehicle 4 by a first cable, and the second speaker system 6 is communicatively coupled to the first media player 21 by a second cable.

In several embodiments, a portable media player 22 is wirelessly communicatively coupled to the first media player 21 such the first media player 21 is configured to receive the second audio file 32 from the portable media player 22 and then send a signal via the second cable to the second speaker system 6 to enable the vehicle audio system to simultaneously play a first audio from the first media player 21 via the first speaker system 5 and play a second audio from the portable media player 22 via the second speaker system 6 such that the first audio is primarily directed to the first seat 11 and the second audio is primarily directed to a second seat 12 of the vehicle 4 to enable a first passenger sitting in the first seat 11 to primarily hear the first audio and to enable a second passenger sitting in the second seat 12 to primarily hear the second audio. In some embodiments, the first audio can be a first song and the second audio can be a second song, which is not the first song. For example, rather than a system that plays different parts of one song from different speakers in a car, the vehicle audio system enables the important advantage of being able to play two different songs at the same time inside the vehicle 4. The driver can listen to one song while a passenger can listen to a different song at the same time. The orientation and directivity of the speakers enable the driver to hear her song much louder than the passenger can hear the driver's song. Similarly, the orientation and directivity of the speakers enables the passenger to hear his song much louder than the driver can hear the passenger's song. In some embodiments, the driver cannot hear the passenger's song and the passenger cannot hear the driver's song even though the driver's song and the passenger's song are being played by the vehicle 4 at the same time.

"LiFi" is a type of light data transmission using lights. Light emitting diodes ("LEDs") can be used in LiFi as light transmitters.

In some embodiments, the first speaker system 5 is configured to receive a wireless communication via a light data transmission from the vehicle 4, and the wireless communication is adapted to enable the first speaker system 5 to emit the first sound.

In several embodiments, the vehicle 4 comprises a first directional antenna 57 located in a front half of the vehicle 4 and a second directional antenna 58 located in the back half of the vehicle 4. The first directional antenna 57 and the second directional antenna 58 can be communicatively coupled to a signal processor 59 configured to measure signal strength from a portable media player 22 located in the vehicle 4 to determine if the portable media player 22 is located closer to the first seat 11 or closer to a second seat 12 of the vehicle 4. The second speaker system 6 can be located above the second seat 12. The vehicle audio system can be configured to emit the second sound from the second speaker system 6 (and not from the first speaker system 5) in response to determining that the portable media player 22 is closer to the second seat 12 than to the first seat 11. The vehicle audio system can be configured to emit another sound from the first speaker system 5 (and not from the second speaker system 6) in response to determining that the portable media player 22 is closer to the first seat 11 than to the second seat 12. The directional antenna system can be used to play music received from a particular media player at a particular speaker location in response to determining that the media player is most likely being held at a seat under the particular speaker location.

Some speaker embodiments have high directivity due to modulating audible sound onto high-frequency ultrasound. The high-frequency ultrasound has short wavelengths. As a result, the sound from these embodiments has excellent directivity.

Holosonics Research Labs, Inc. of Watertown, Mass. currently makes Audio Spotlight speakers, which use ultrasound to enable excellent directivity. Audio Spotlight speakers use ultrasounds with very small wavelengths. The small wavelengths cause the sound to be highly directional. The ultrasounds are undetectable to the human ear, but the small wavelengths of the ultrasounds interact with the air. This interaction causes frequencies that are audible to the human ear (to provide the desired sound).

Figure 10:
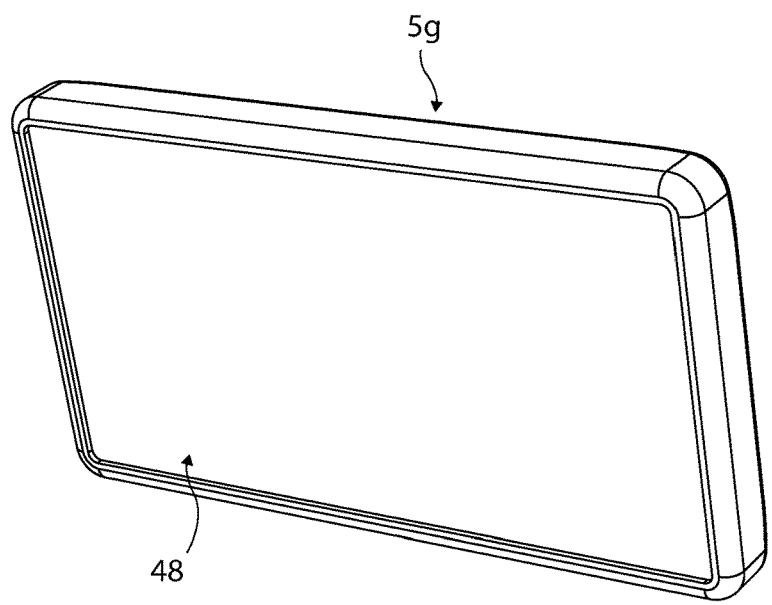
FIG. 10 illustrates a front, top, and side perspective view of an ultrasound speaker, according to some embodiments.
Figure 11:
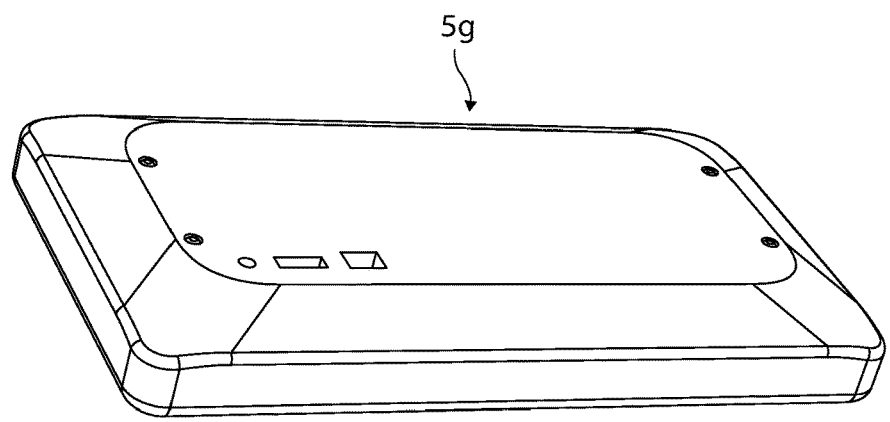
FIG. 11 illustrates a back, bottom, and side perspective view of the ultrasound speaker shown in FIG. 10, according to some embodiments.

The following patents are incorporated by reference herein and relate to parametric, ultrasonic audio speakers: U.S. Pat. No. 8,027,488 entitled Parametric Audio System; U.S. Pat. No. 9,036,827 entitled Parametric Audio System; U.S. Pat. No. 7,596,228 entitled Parametric Array Modulation and Processing Method; and U.S. Pat. No. 6,914,991 entitled Parametric Audio Amplifier System. FIG. 10 illustrates a front, top, and side perspective view of an ultrasound speaker 5g. FIG. 11 illustrates a back, bottom, and side perspective view of the ultrasound speaker 5g shown in FIG. 10. The ultrasound speaker 5g has a front portion 48 through which sound is directed (towards a seat of the vehicle). The ultrasound speaker 5g can include any of the features and technologies described in U.S. Pat. No. 8,027,488 entitled Parametric Audio System; U.S. Pat. No. 9,036,827 entitled Parametric Audio System; U.S. Pat. No. 7,596,228 entitled Parametric Array Modulation and Processing Method; and/or U.S. Pat. No. 6,914,991 entitled Parametric Audio Amplifier System.

Figure 12:
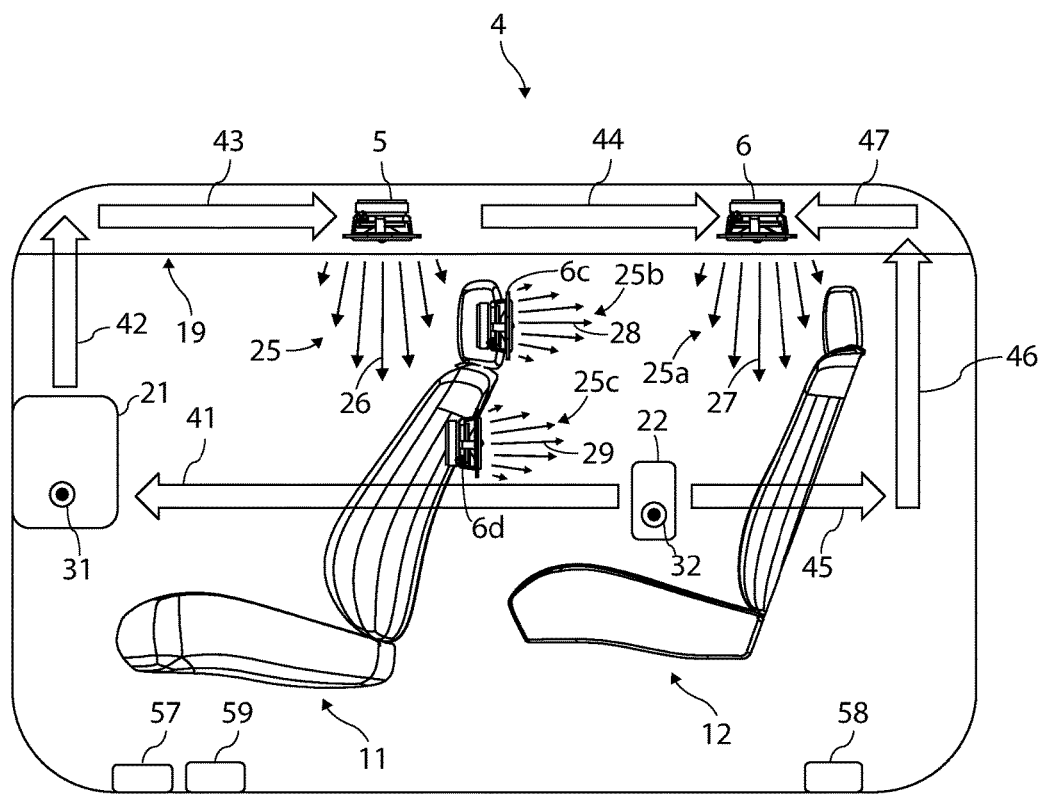
FIG. 12 illustrates a diagrammatic, side view of the vehicle illustrated in FIG. 1, according to some embodiments.

FIG. 12 illustrates a diagrammatic, side view of the vehicle 4 illustrated in FIG. 1. FIG. 12 is very similar to FIG. 4 except that additional elements are shown in FIG. 12. A speaker system 6c is coupled to a first back portion (e.g., a headrest) of a first front seat 11 (e.g., a driver seat) and is oriented such that the first sound is primarily directed in a first direction 28 from the first front seat 11 towards a first back seat 12 (e.g., a seat located behind the driver seat). In some embodiments, both front seats include speakers coupled to headrests and/or backrests and oriented towards back seats.

The front seat 11 can include another speaker system 6d that is oriented such that sound from the speaker system 6d is oriented towards a seat 12 located behind the front seat 11. This speaker system 6d can be coupled to a backrest of the front seat 11. Arrow 29 illustrates how the sound 25c from the speaker is primarily directed towards the seat 12 located behind the front seat 11.

Speakers 6c, 6d are coupled to rearward portions of the seat 11. As used herein, "rearward" is used in a broad sense to mean directed towards the rear of the vehicle 4.

The back seat 12 can include a first directional speaker system 6c and a second directional speaker system 6d directing sound from the front seat 11 towards the back seat 12. The back seat can also include a third speaker system 6 that directs sound downward from the ceiling towards the back seat 12.

Figure 13:
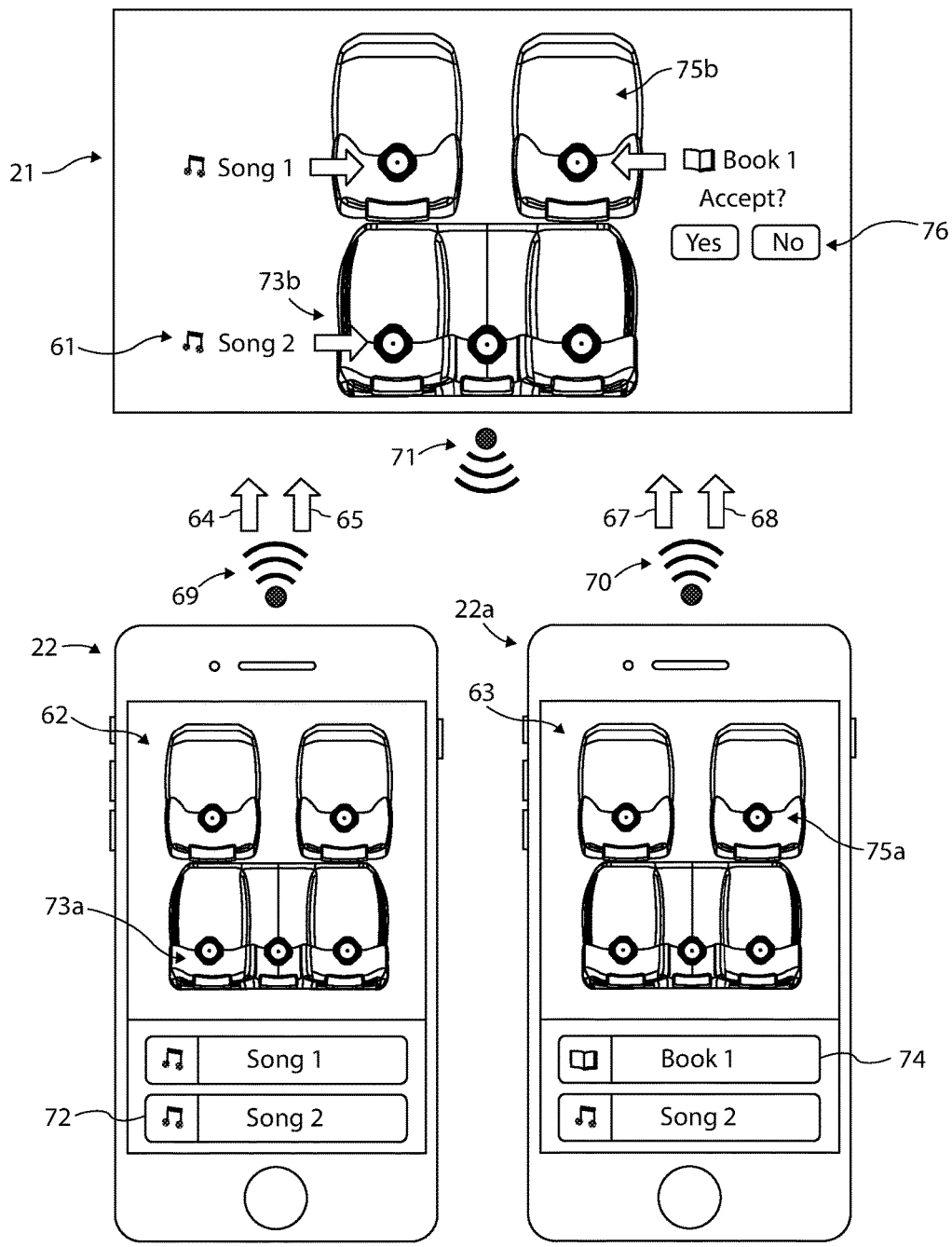
FIG. 13 illustrates a diagrammatic view of a media player and a portable computing device shown in FIG. 4, according to some embodiments.

FIG. 13 illustrates a diagrammatic view of a first media player 21, a first portable computing device 22, and a second portable computing device 22a that can be wirelessly communicatively coupled to each other inside the vehicle 4 (e.g., via radio waves such as Bluetooth). The first media player 21 can be built into the infotainment system of the vehicle 4 and can include a touch screen configured to enable a person (e.g., a driver or front passenger) to control which seat listens to which audio file. For example, a driver might select a first seat icon on the touch screen of the first media player 21 and then select a song called "Thunderstruck" by AC/DC.

A driver might then select a second seat icon of the first media player 21 and select a song called "Moneytalks" by AC/DC for the second seat's passenger to hear. The vehicle audio system can then simultaneously emit "Thunderstruck" by AC/DC from a speaker system directed primarily at the first seat and "Moneytalks" by AC/DC from a speaker system directed primarily at the second seat such that a first person in the first seat hears "Thunderstruck" and can either not hear "Moneytalks" or at least can only barely hear "Moneytalks" while a second person in the second seat hears "Moneytalks" and can either not hear "Thunderstruck" or at least can only barely hear "Thunderstruck." As a result, the first person can enjoy listening to "Thunderstruck" at the same time the second person enjoys listening to "Moneytalks" without either person using headphones. The direction in which the speakers are oriented and the location of the speakers help achieve this remarkable system. Speakers with high directivity are also helpful.

The first media player 21 can have any suitable input device configured to enable people to select seats and audio items. Input devices can include touch pads, touch screens, keypads, knobs, buttons, controls, voice activated Alexa microphone systems, and any other suitable system.

In some embodiments, a vehicle audio system comprises a first speaker system directed primarily towards a first seat of the vehicle and configured to emit a first sound based on a first audio file; and a second speaker system directed primarily towards a second seat of the vehicle and configured to emit a second sound based on a second audio file that is "unrelated" to the first audio file while the first speaker system emits the first sound. The primarily purpose of this paragraph is to explain how the term "unrelated" is used herein. Some vehicles simultaneously play different portions of one song based on an audio file. For example, a car can play a bass portion of the song "Thunderstruck" from a first speaker (e.g., a subwoofer located in the trunk) while playing a treble portion of the song "Thunderstruck" from a second speaker (e.g., a tweeter). This is not playing a second audio file that is "unrelated" to the first audio file because both the bass portion and the treble portion are from the same song, which in this example is "Thunderstruck." In other words, two portions of the same song are not "unrelated" as used herein. In contrast, a vehicle 4 can play "Thunderstruck" based on a first audio file and from a first speaker system 5 while playing "Moneytalks" based on a second audio file and from a second speaker system 6. The audio file of "Thunderstruck" is unrelated to the audio file of "Moneytalks." The first audio file can be an MP3 file of the song "Thunderstruck." The second audio file can be an MP3 file of the song "Moneytalks."

Referring now primarily to FIGS. 12 and 13, there are times when passengers (e.g., in the back of the car) want to choose their own audio. A first passenger can use her first portable computing device 22 (e.g., an iPhone) to select which seat hears which song (or other audio). She can click on a seat and then click on a song for that seat to hear. A second passenger can use her second portable computing device 22a (e.g., an iPad) to select which seat hears which song (or other audio). She can click on a seat and then click on a song or book for that seat to hear. The first media player 21 can determine whether the selections from portable computing devices 22, 22a are accepted and can override selections from portable computing devices 22, 22a.

In some embodiments, the vehicle audio system comprises a first media player 21 configured to receive a first seat selection 73a from a first portable computing device 22 of a first passenger (which can be a driver or any other passenger) of the vehicle 4. The first seat selection 73a can represent a seat 12 illustrated in FIG. 3. The first passenger can select an icon 72 that represents "Song 2."

The first media player 21 is configured to receive a first indication 64 of the seat 12 and a second indication 65 of the audio file (e.g., of "Song 2") from the first portable computing device 22. Then, in response to receiving the first indication 64 and the second indication 65, the first media player 21 is configured to send a signal 44 to the speaker system 6 directed at the seat 12 to cause the speaker system 6 to primarily direct the first sound 25a (e.g., of "Song 2") to the seat 12 such that other speaker systems (e.g., speaker system 5) do not emit the first sound 25a.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A vehicle audio system coupled to a vehicle, the vehicle audio system comprising:
    a first speaker system located above a first seat of the vehicle and configured to emit a first sound based on a first audio file; and
    a second speaker system coupled to the vehicle and configured to emit a second sound based on a second audio file that is unrelated to the first audio file while the first speaker system emits the first sound,
    wherein the first speaker system is communicatively coupled to a first media player such that the first speaker system emits the first sound based on the first audio file from the first media player, and the second speaker system is communicatively coupled to a second media player such that the second speaker system emits the second sound based on the second audio file from the second media player,
    wherein the first media player is a portion of the vehicle, and the second media player is a portable media player configured to be transportable by a passenger of the vehicle once the passenger reaches a drop-off location and leaves the vehicle.

2. The system of claim 1, wherein the first speaker system is oriented downward from a ceiling of the vehicle towards a driver seat of the vehicle such that the vehicle audio system is configured to make the first sound at least 40 percent louder for a driver of the vehicle than for the passenger sitting in a passenger seat of the vehicle.

3. The system of claim 1, wherein the second speaker system is located above a second seat of the vehicle and is oriented downward from a ceiling of the vehicle towards the second seat such that the vehicle audio system is configured to make the second sound at least 40 percent louder at a second sitting position of the second seat compared to a first sitting position of the first seat, and wherein the first speaker system is oriented downward from the ceiling of the vehicle towards the first seat such that the vehicle audio system is configured to make the first sound at least 40 percent louder at the first sitting position of the first seat compared to the second sitting position of the second seat.

4. The system of claim 1, wherein the first speaker system is coupled to a ceiling of the vehicle and is oriented such that the first sound is primarily directed in a first direction from the ceiling towards the first seat, the second speaker system is located above a second seat of the vehicle, and the second speaker system is coupled to the ceiling of the vehicle and is oriented such that the second sound is primarily directed in a second direction from the ceiling towards the second seat.

5. The system of claim 1, wherein the second media player is communicatively coupled to the vehicle such that the vehicle is configured to receive the second audio file from the second media player and then transmit a signal to the second speaker system, wherein the signal is configured to enable the second speaker system to emit the second sound based on the second audio file.

6. The system of claim 1, wherein the first speaker system comprises a first speaker having a first diaphragm that is oriented towards the first seat, wherein the first diaphragm has a first outer diameter of at least ten inches, and the second speaker system comprises a second speaker having a second diaphragm that is oriented towards a second seat of the vehicle, wherein the second diaphragm has a second outer diameter of at least ten inches.

7. The system of claim 6, wherein the first and second speaker systems are at least partially recessed in a ceiling of the vehicle.

8. The system of claim 1, wherein the first speaker system comprises a first speaker array having at least five speakers oriented towards the first seat.

9. The system of claim 8, wherein the second speaker system comprises a second speaker array having at least five speakers oriented towards a second seat of the vehicle.

10. The system of claim 9, wherein the first and second speaker arrays are at least partially recessed in a ceiling of the vehicle.

11. The system of claim 1, wherein the first speaker system comprises a first speaker and a first dome, wherein the first speaker is configured to emit the first sound towards a first interior area of the first dome, and the first dome is configured to direct the first sound towards the first seat.

12. The system of claim 11, wherein the second speaker system comprises a second speaker and a second dome, wherein the second speaker is configured to emit the second sound towards a second interior area of the second dome, and the second dome is configured to direct the second sound towards a second seat of the vehicle.

13. The system of claim 12, wherein the first and second domes are at least partially recessed in a ceiling of the vehicle.

14. The system of claim 1, wherein the first speaker system comprises a first parametric audio amplifier system configured to use modulated ultrasound to create the first sound in air of a first sitting position of the first seat.

15. The system of claim 14, wherein the first parametric audio amplifier system is coupled to a ceiling of the vehicle such that the first parametric audio amplifier system is configured to direct the modulated ultrasound towards the first sitting position.

16. The system of claim 15, wherein the second speaker system comprises a second parametric audio amplifier system configured to create the second sound.

17. The system of claim 1, wherein the first speaker system comprises a battery configured to provide electrical power to the first speaker system.

18. The system of claim 17, wherein the first speaker system comprises a near-field charging module configured to enable the battery to be wirelessly charged by the vehicle.

19. The system of claim 1, wherein the first speaker system comprises an antenna configured to receive a first wireless communication adapted to enable the first speaker system to emit the first sound.

20. A vehicle audio system coupled to a vehicle, the vehicle audio system comprising:
a first speaker system located above a first seat of the vehicle and configured to emit a first sound based on a first audio file; and
a second speaker system coupled to the vehicle and configured to emit a second sound based on a second audio file that is unrelated to the first audio file while the first speaker system emits the first sound, wherein the first speaker system is communicatively coupled to a first media player of the vehicle by a first cable, and the second speaker system is communicatively coupled to the first media player by a second cable,
wherein a portable media player is wirelessly communicatively coupled to the first media player such the first media player is configured to receive the second audio file from the portable media player and then send a signal via the second cable to the second speaker system to enable the vehicle audio system to simultaneously play a first audio from the first media player via the first speaker system and play a second audio from the portable media player via the second speaker system such that the first audio is primarily directed to the first seat and the second audio is primarily directed to a second seat of the vehicle to enable a first passenger sitting in the first seat to primarily hear the first audio and to enable a second passenger sitting in the second seat to primarily hear the second audio.

21. The system of claim 20, wherein the first audio file and the second audio file are different songs.

22. The system of claim 1, wherein the first speaker system is configured to receive a wireless communication via a light data transmission from the vehicle, and the wireless communication is adapted to enable the first speaker system to emit the first sound.

23. A vehicle audio system coupled to a vehicle, the vehicle audio system comprising:
a first speaker system located above a first seat of the vehicle and configured to emit a first sound based on a first audio file; and
a second speaker system coupled to the vehicle and configured to emit a second sound based on a second audio file that is unrelated to the first audio file while the first speaker system emits the first sound, wherein the vehicle comprises a first directional antenna located in a front half of the vehicle and a second directional antenna located in a back half of the vehicle, wherein the first directional antenna and the second directional antenna are communicatively coupled to a signal processor configured to measure signal strength from a portable media player located in the vehicle to determine if the portable media player is located closer to the first seat or closer to a second seat of the vehicle.

24. The system of claim 23, wherein the second speaker system is located above the second seat.

25. The system of claim 23, wherein the vehicle audio system is configured to emit the second sound from the second speaker system and not from the first speaker system in response to determining that the portable media player is closer to the second seat than to the first seat.

26. The system of claim 23, wherein the first speaker system is oriented towards the first seat and the second speaker system is oriented towards the second seat.

27. The system of claim 20, wherein the first speaker system is oriented downward from a ceiling of the vehicle towards the first seat such that the vehicle audio system is configured to make the first sound at least 40 percent louder at a first sitting position of the first seat compared to a second sitting position of the second seat.

28. The system of claim 27, wherein the second speaker system is located above the second seat of the vehicle and is oriented downward from the ceiling of the vehicle towards the second seat such that the vehicle audio system is configured to make the second sound at least 40 percent louder at the second sitting position of the second seat compared to the first sitting position of the first seat.

* * * * *